(12) United States Patent
Morita

(10) Patent No.: US 11,235,750 B2
(45) Date of Patent: Feb. 1, 2022

(54) CONTROL APPARATUS

(71) Applicant: DENSO CORPORATION, Kariya (JP)

(72) Inventor: Yoshinori Morita, Kariya (JP)

(73) Assignee: DENSO CORPORATION, Kariya (JP)

(*) Notice: Subject to any disclaimer, the term of this patent is extended or adjusted under 35 U.S.C. 154(b) by 215 days.

(21) Appl. No.: 16/365,843

(22) Filed: Mar. 27, 2019

(65) Prior Publication Data
US 2019/0299973 A1  Oct. 3, 2019

(30) Foreign Application Priority Data

Mar. 28, 2018 (JP) .............................. JP2018-063218

(51) Int. Cl.
*B60W 20/14* (2016.01)
*B60W 10/06* (2006.01)
(Continued)

(52) U.S. Cl.
CPC ............. *B60W 20/14* (2016.01); *B60K 6/485* (2013.01); *B60W 10/06* (2013.01); *B60W 10/08* (2013.01);
(Continued)

(58) Field of Classification Search
CPC ...... B60W 20/14; B60W 10/06; B60W 10/08; B60W 10/26; B60W 30/18127;
(Continued)

(56) References Cited

U.S. PATENT DOCUMENTS

2002/0157882 A1* 10/2002 Kubo ...................... B60K 6/28
180/65.26
2012/0043145 A1*  2/2012 Gecim ................... B60K 6/485
180/65.28
(Continued)

FOREIGN PATENT DOCUMENTS

| JP | 2012-090404 A | 5/2012 |
| JP | 2013-252765 A | 12/2013 |
| JP | 2014-004928 A | 1/2014 |

OTHER PUBLICATIONS

English translation of Shota, JP 2016-30524 A, Published Mar. 7, 2016, pp. 3-4 (Year: 2016).*
(Continued)

*Primary Examiner* — James J Lee
*Assistant Examiner* — Alexander George Matta
(74) *Attorney, Agent, or Firm* — Oliff PLC

(57) ABSTRACT

A control apparatus is used in a vehicle equipped with an internal combustion engine, a rotating electrical machine, and a storage battery. The control apparatus stops the engine when a state of charge (SOC) of the storage battery is higher than a lower limit, and an automatic stop condition is met and also restarts the engine when the SOC of the storage battery is lower than the lower limit, and an automatic restart condition is met. The control apparatus also controls operation of the rotating electrical machine to generate electricity to increase the SOC above a target SOC and also actuates the rotating electrical machine to assist in driving the vehicle when the SOC is higher than a torque assist enable SOC. The
(Continued)

target SOC is set higher than the lower limit. The torque assist enable SOC is set higher than the target SOC. This improves the fuel economy.

10 Claims, 4 Drawing Sheets

(51) Int. Cl.
*B60W 10/08* (2006.01)
*B60W 10/26* (2006.01)
*B60W 30/18* (2012.01)
*B60K 6/485* (2007.10)

(52) U.S. Cl.
CPC ...... *B60W 10/26* (2013.01); *B60W 30/18127* (2013.01); *B60W 2510/244* (2013.01); *B60W 2710/0644* (2013.01); *B60W 2710/083* (2013.01); *B60W 2710/244* (2013.01); *B60Y 2200/92* (2013.01)

(58) Field of Classification Search
CPC ... B60W 2510/244; B60W 2710/0644; B60W 2710/083; B60W 2710/244; B60K 6/485; B60Y 2200/92
See application file for complete search history.

(56) References Cited

U.S. PATENT DOCUMENTS

| | | | |
|---|---|---|---|
| 2014/0257636 A1* | 9/2014 | Ueki | B60W 10/30 701/36 |
| 2018/0134174 A1* | 5/2018 | Jang | B60L 11/1862 |
| 2018/0361844 A1* | 12/2018 | Kinzuka | B60K 6/24 |
| 2019/0293031 A1* | 9/2019 | Dudar | F01N 3/10 |
| 2020/0238971 A1* | 7/2020 | Hirata | B60W 10/26 |

OTHER PUBLICATIONS

English translation of Goro, JP 2013-91469 A, Published May 16, 2013, pp. 2-5 (Year: 2013).*
English translation of Yoji, JP 2002-354612 A, Published Dec. 6, 2002, pp. 2-5 (Year: 2002).*

* cited by examiner

VEHICLE SPEED DRIVER'S OPERATION

CONTROL APPARATUS

CROSS REFERENCE TO RELATED DOCUMENT

The present application claims the benefit of priority of Japanese Patent Application No. 2018-63218 filed on Mar. 28, 2018, the disclosure of which is incorporated herein by reference.

BACKGROUND

1 Technical Field

This disclosure relates generally to a control apparatus for use in a vehicle equipped with an internal combustion engine and a storage battery.

2 Background Art

A vehicle is known which is equipped with a rotating electrical machine which works to assist in producing torque to move the vehicle in a torque assist mode and also stop an internal combustion engine in an idle stop mode. When a state of charge (SOC) of a storage battery is higher than a first threshold value, the idle stop mode is permitted to be entered, while when the state of charge of the storage battery is higher than a second threshold larger than the first threshold, the torque assist mode is permitted to be entered. This achieves the idle stop mode which is more effective in saving fuel in the internal combustion engine in priority to execution of the torque assist mode in order to improve the fuel economy.

It is known that delivery of electric power from the storage battery to an electrical load is more effective in terms of fuel economy than that to the rotating electrical machine to execute the torque assist mode. The above system, however, does not consider securing of electric power delivered to the electrical load and may execute the torque assist mode in preference to delivery of electric power to the electrical load, which loses a chance to supply electric power to the electrical load. This is ineffective in improving the fuel economy.

SUMMARY

It is therefore an object of this disclosure to provide a control apparatus capable of improving fuel economy.

According to one aspect of the invention, there is provided a control apparatus for use in a vehicle which is equipped with an internal combustion engine, a starter which works to start the internal combustion engine, a rotating electrical machine which selectively works in a torque assist mode to assist in moving a vehicle and a power generation mode to generate electricity, a storage battery which is charged by electric power delivered from the rotating electrical machine, and an electrical load to which electric power is supplied from the storage battery. The vehicle is designed to stop the internal combustion engine in an idle stop mode. The control apparatus comprises: (a) a stop controller which stops the internal combustion engine in the idle stop mode when a state of charge of the storage battery is higher than a lower limit above which the idle stop mode is permitted to be entered, and an automatic stop condition is met; (b) a start controller which controls operation of the starter to restart the internal combustion engine when the state of charge of the storage battery is lower than or equal to the lower limit or a restart condition is met during the idle stop mode; (c) a power generation controller which controls generation of electricity by the rotating electrical generator to bring the state of charge of the storage battery to be higher than or equal to a target state of charge; (d) a torque assist controller which controls operation of the rotating electrical machine in a torque assist mode to assist in driving the vehicle when the state of charge of the storage battery is higher than a torque assist enable state of charge, and the torque assist mode is required to be entered; and (e) a SOC determiner which determines the target state of charge to be higher than the lower limit and also determines the torque assist enable state of charge to be larger than the target state of charge.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

Figure 1:
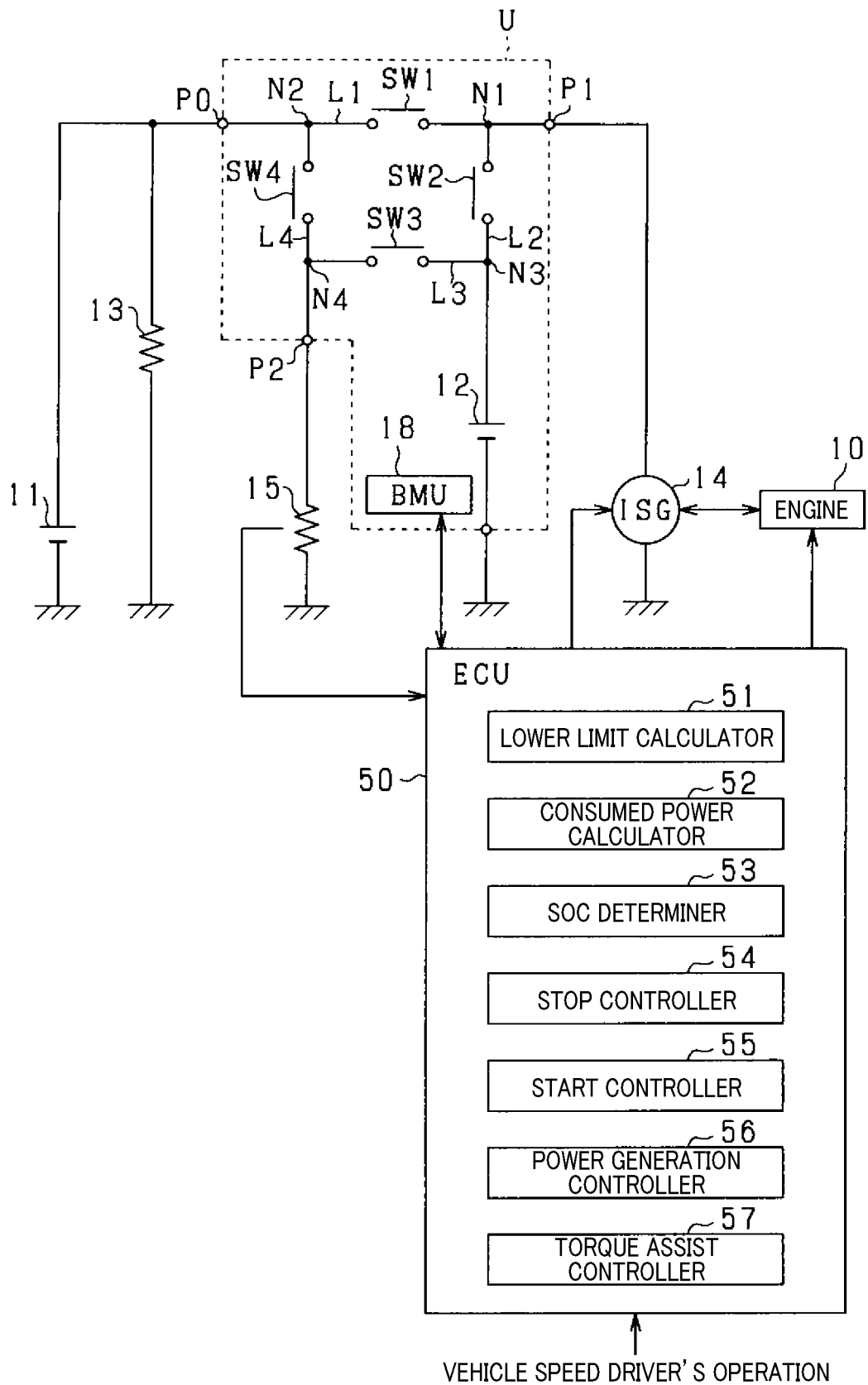
FIG. 1 is a schematic view which illustrates an in-vehicle power supply system according to an embodiment.

Prior to describing an embodiment, a prior art will be referred to below.

For example, Japanese Patent No. 6060535 discloses a vehicle equipped with a rotating electrical machine which works to assist in producing torque to move the vehicle in a torque assist mode and also stop an internal combustion engine in an idle stop mode. When a state of charge (SOC) of a storage battery is higher than a first threshold value, the idle stop mode is permitted to be entered, while when the state of charge of the storage battery is higher than a second threshold larger than the first threshold, the torque assist mode is permitted to be entered. This achieves the idle stop mode which is more effective in saving fuel in the internal combustion engine in priority to execution of the torque assist mode in order to improve the fuel economy.

It is known that delivery of electric power from the storage battery to an electrical load is more effective in terms of fuel economy than that to the rotating electrical machine to execute the torque assist mode. The system taught in the above publication, however, does not consider securing of electric power delivered to the electrical load and may execute the torque assist mode in preference to delivery of electric power to the electrical load, which loses a chance to supply electric power to the electrical load. This is ineffective in improving the fuel economy.

A control apparatus according to an embodiment is used in a vehicle which is equipped with an internal combustion engine, a starter which works to start the internal combustion engine, a rotating electrical machine which selectively works in a torque assist mode to assist in moving a vehicle and a power generation mode to generate electricity, a storage battery which is charged by electric power delivered from the rotating electrical machine, and an electrical load to which electric power is supplied from the storage battery. The vehicle is designed to stop the internal combustion engine in an idle stop mode. The control apparatus comprises: (a) a stop controller which stops the internal combustion engine in the idle stop mode when a state of charge of the storage battery is higher than a lower limit above which the idle stop mode to permitted to be entered, and an automatic stop condition is met; (b) a start controller which controls operation of the starter to restart the internal combustion engine when the state of charge of the storage battery is lower than or equal to the lower limit or a restart condition is met during the idle stop mode; (c) a power generation controller which controls generation of electricity by the rotating electrical generator to bring the state of charge of the storage battery to be higher than or equal to a target state of charge; (d) a torque assist controller which controls operation of the rotating electrical machine in a torque assist mode to assist in driving the vehicle when the state of charge of the storage battery is higher than a torque assist enable state of charge, and the torque assist mode is required to be entered; and (e) a SOC determiner which determines the target state of charge to be higher than the lower limit and also determines the torque assist enable state of charge to be larger than the target state of charge.

The target state of charge is set higher than the lower limit. The torque assist enable state of charge is set higher than the target state of charge. This causes the torque assist enable state of charge to be higher than the target state of charge even when the electrical energy in the storage battery is consumed by the torque assist mode until the state of charge of the storage battery drops and reaches the torque assist enable state of charge, thereby enabling the storage battery to continue to deliver electric power to the electrical load until the state of charge of the storage battery decreases from the torque assist enable state of charge to the target state of charge. In other words, the control apparatus keeps electrical energy stored in storage battery which is required to be delivered to the electrical load and, when the storage battery stores an amount of electric power sufficient to additionally achieve the torque assist mode, permits the torque assist mode to be performed until such an excessive amount of electric power is fully consumed.

The delivery of electric power in the storage battery to the electrical load is more effective than that to the rotating electrical machine to operate in the torque assist mode in terms of fuel economy. Chances to deliver electric power to the electrical load may, therefore, be increased to improve power efficiency by achieving the delivery of electric power to the electrical load in priority to execution of the torque assist mode. This improves the fuel economy in the internal combustion engine.

The target state of charge is, as described above, set higher than the lower limit, thereby enabling the idle stop mode to continue to stop the internal combustion engine when the electric power in the storage battery is consumed by the electrical load during stopping of the internal combustion engine. The target state of charge set higher than the lower limit also enables an amount of electric power to be stored in the storage battery which is sufficient to ensure chances to stop the internal combustion engine in the idle stop mode even when there is an insufficient period of time to charge the storage battery after the internal combustion engine is restarted. This results in increased chances to stop the internal combustion engine in the idle stop mode, thereby improving the fuel economy.

The embodiment will also be discussed with reference to the drawings. The control apparatus in this embodiment is implemented by an engine electronic control unit (ECU) for use with an in-vehicle power supply system working to deliver electric power to various devices mounted in a vehicle powered by an internal combustion engine. The same or similar reference numbers used throughout the drawings refer to the same or similar parts, and repeated explanation thereof will be omitted.

The in-vehicle power supply system is, as illustrated in FIG. 1, designed as a dual power supply system equipped with the lead-acid storage battery 11 and the lithium-ion battery 12 which deliver electric power to the electrical loads 13 and 15. The in-vehicle power supply system also works to deliver the power from each of the storage batteries 11 and 12 or charge each of the storage batteries 11 and 12 using the rotating electrical machine 14. The lead-acid storage battery 11 and the lithium-ion battery 12 are connected to the rotating electrical machine 14 in parallel to each other. The lead-acid storage battery 11 and the lithium-ion battery 12 are also connected to the electrical load 15 in parallel to each other.

The lead-acid storage battery 11 is a typical general-purpose storage battery, while the lithium-ion battery 12 is made of a high density energy storage battery which is lower in power loss than the lead-acid storage battery 11 in charge or discharge operation, that is, higher in power density than the lead-acid storage battery 11. It is advisable that the lithium-ion battery 12 be higher in energy efficiency than the lead-acid storage battery 11 in charge or discharge operation. The lithium-ion battery 12 is engineered as an assembled battery made up of a plurality of electrical cells. The batteries 11 and 12 are identical in rated voltage (e.g., 12V) with each other.

Although not explained in detail using drawings, the lithium-ion battery 12 is assembled with a substrate as the battery unit U and disposed in a housing. The battery unit U is indicated by a broken line in FIG. 1. The battery unit U has the external terminals P0, P1, and P2. The lead-acid storage battery 11 and the electrical load 13 are connected to the external terminal P0. The rotating electrical machine 14 is connected to the external terminal P1. The electrical load 15 is connected to the external terminal P2.

The rotating electrical machine 14 is engineered as an ISG (Integrated Starter Generator) that is an electrical generator, such as a three-phase electrical motor or a power converter, which is capable of selectively operating in a motor mode and equipped with an inverter. The rotating electrical machine 14 is mechanically coupled with the engine 10 and an axle of a vehicle. The rotating electrical machine 14 is capable of selectively operating in a fuel-powered electrical generator mode in which electricity is generated by drive energy transmitted from an output shaft of the engine 10 and in a regenerative power generation mode (e.g., a regenerative braking mode) in which electricity is generated by rotational energy (i.e., kinetic energy) of an axle of the vehicle. The rotating electrical machine 14, thus, works to deliver generated power to the batteries 11 and 12 and the electrical load 15.

The rotating electrical machine 14 also works as a motor mode to apply torque to the output shaft of the engine 10. The rotating electrical machine 14 is supplied with electric power from the lithium-ion battery 12 to execute the motor mode. For instance, when the engine 10 is at rest, and it is required to start the engine 10, the rotating electrical machine 14 works to provide torque to the output shaft of the engine 10 to start the engine 10. In other words, the rotating electrical machine 14 serves as an engine starter. The rotating electrical machine 14 also works in a torque assist mode to apply torque to the axle of the vehicle or the output shaft of the engine 10 to assist in driving the vehicle.

The electrical load 15 includes a constant-voltage requiring electrical device which requires voltage to be supplied thereto at a constant level or permits the supplied voltage to vary only within a given range. The electrical load 15 is, therefore, an electrical load which is needed to be electrically protected and can not tolerate a malfunction of an electric power supply.

As an example of the constant-voltage requiring electrical device, the electrical load 15 is implemented by a navigational device, an audio device, a meter, or an ECU including the engine ECU 50. Unwanted resetting of such an electrical load is avoided by decreasing a variation in voltage of power supplied to such an electrical load, thereby ensuring the stability in operation of the electrical load. The electrical load 15 may also include a vehicle driving actuator, such as an electric power steering device or a braking device.

The electrical load 13 is a typical electrical device other than the constant-voltage requiring electrical device. For instance, the electrical load 13 is implemented by a seat heater, a heater for a rear window defroster, a headlamp, a front windshield wiper, or an electric fan of an air conditioner.

The battery unit U will be discussed below. The battery unit U has disposed therein the electrical path L1 which connects between the external terminals P0 and P1 and the electrical path L2 which connects the junction N1 on the electrical path L1 and the lithium-ion battery 12 together. The electrical path L1 has the switch SW1 disposed thereon. The electrical path L2 has the switch SW2 disposed thereon. The electric power generated by the rotating electrical machine 14 is delivered to the lead-acid storage battery 11 or the lithium-ion battery 12 through the electrical path L1 or L2.

Specifically, the switch SW1 is arranged on an electrical path extending from the lead-acid storage battery 11 and the lithium-ion battery 12 and located closer the lead-acid storage battery 11 (i.e., the external terminal P0) than the junction N1 is. The switch SW2 is also disposed on the electrical path extending from the lead-acid storage battery 11 and the lithium-ion battery 12 and located closer to the lithium-ion battery 12 than the junction N1 is.

The battery unit U also has disposed therein the electrical path L4 connecting between the junction N2 on the electrical path L1 (i.e., a junction arranged between the external terminal P0 and the switch SW1) and the external terminal P2. The electrical path L4 is a path through which electric power is delivered from the lead-acid storage battery 11 to the electrical load 15. The electrical path L4 has the switch SW4 disposed between the junction N2 and the junction N4.

The battery unit U has also disposed therein the electrical path L3 which connects between the junction N3 on the electrical path L2 (i.e., a junction arranged between the switch SW2 and the lithium-ion battery 12) and the junction N4 on the electrical path L4 (i.e., a junction arranged between the switch SW4 and the external terminal P2). The electrical path L3 defines a path through which electric power is delivered from the lithium-ion battery 12 to the electrical load 15. The electrical path L3 has the switch SW3 disposed between the junction N3 and the junction N4. Specifically, the switch SW4 is arranged on an electrical path extending from the lead-acid storage battery 11 to the lithium-ion battery 12 and located closer to the lead-acid storage battery 11 than the junction N4 is. The switch SW3 is arranged on the electrical path extending from the lead-acid storage battery 11 to the lithium-ion battery 12 and located closer to the lithium-ion battery 12 than the junction N4 is.

The battery unit U is equipped with the BMU (Battery Management Unit) 18 which works to control operations of the switches SW1 to SW4. The BMU 18 is implemented by a microcomputer including a CPU, a ROM, a RAM, and an input/output interface. The BMU 18 controls on/off operations of the switches SW1 to SW4.

The BMU 18 monitors condition(s) of the lithium-ion battery 12 and outputs information about such conditions in the form of electrical signals. For instance, the conditions of the lithium-ion battery 12 include the temperature and the state of deterioration of the lithium-ion battery 12, an output voltage from the lithium-ion battery 12, and the SOC of the lithium-ion battery 12.

Specifically, the BMU 18 measures or calculates the SOC of the lithium-ion battery 12 (i.e., electrical energy remaining in the lithium-ion battery 12) and outputs information on the SOC in the form of an electrical signal. The calculation of the SOC may be achieved in a known way as a function of, for example, an OCV (Open Circuit Voltage) at the lithium-ion battery 12 when current does not flow into or from the lithium-ion battery 12. The SOC may be updated by cyclically summing an amount of electrical current flowing into or from the lithium-ion battery 12 in the charge or discharge operation. In the following discussion, the SOC of the lithium-ion battery 12 will be merely referred to below as a SOC.

The BMU 18 also monitors the state of deterioration of the lithium-ion battery 12 and outputs information thereabout in the form of an electrical signal. The monitoring of the deterioration of the lithium-ion battery 12 may be achieved in a known way by calculating an internal resistance of the lithium-ion battery 12 using a combination of a terminal-to-terminal voltage at the lithium-ion battery 12 and a charge or discharge current in the lithium-ion battery 12 and calculating the state of the deterioration as a function of the internal resistance.

The BMU 18 acquires the temperature of the lithium-ion battery 12 from a temperature sensor (not shown) which measures the temperature of the lithium-ion battery 12 and outputs information thereabout in the form of an electrical signal. The BMU 18 also acquires an output voltage at the lithium-ion battery 12 from a voltage sensor (not shown) which measures the output voltage at the lithium-ion battery 12 and outputs information thereabout in the form of an electrical signal.

The engine ECU 50 (which will also be merely referred to as the ECU 50) is implemented by a known microcomputer including a CPU, a ROM, a RAM, and a flash memory. The ECU 50 obtains various types of information. The ECU 50 acquires information about driver's operations, for example, an output from an accelerator position sensor indicating a position of an accelerator and an output from a brake position sensor indicating a position of a brake pedal. The ECU 50 also acquires the information about the state of the lithium-ion battery 12 from the BMU 18. The ECU 50 also acquires information about the condition of the vehicle, for example, the speed of the vehicle from a vehicle speed sensor. The ECU 50 also acquires information about the state of operation of the electrical load 15 from the electrical load 15.

The ECU 50 analyzes the acquired information to execute various control tasks. For example, the ECU 50 controls a motor operation or an electricity-generating operation of the rotating electrical machine 14 using information about the speed of the vehicle or the driver's operation. For example, the ECU 50 works in the torque assist mode to deliver torque, as produced by the rotating electrical machine 14, to the axle of the vehicle, i.e., the drive wheels of the vehicle when the vehicle is traveling. The torque assist mode, as referred to herein, is to control the operation of the rotating electrical machine 14 to deliver torque to the axle of the vehicle or the output shaft of the engine 10 to assist in moving the vehicle. The ECU 50 may stop the engine 10 and only use torque output from the rotating electrical machine 14 to move the vehicle when the speed of the vehicle is low. The torque assist mode is entered when a given torque assist condition is met meaning that it is required for the torque assist mode to be entered. For instance, the torque assist condition includes a condition where a brake is not actuated, and the degree to which an accelerator is actuated is higher than a given level.

The ECU 50 also controls the charge or discharge operation of the lithium-ion battery 12 as a function of the SOC of the lithium-ion battery 12. Specifically, the ECU 50 instructs the BMU 18 of the battery unit U to bring the SOC of the lithium-ion battery 12 to within a given available range defined by a flat section (also called a plateau region) of a charge/discharge curve where a variation in voltage is small. The BMU 18 controls the operations of the switches SW1 to SW4 according to the instruction from the ECU 50 to control the charge or discharge operation of the lithium-ion battery 12.

The ECU 50 also controls operations of the engine 10 including start and stop operations of the engine 10. For instance, the ECU 50 executes an idle stop mode of the engine 10. The idle stop mode is to stop the engine 10 from operating (i.e., combustion of fuel in the engine 10) when given automatic stop conditions are met and then restart the engine 10 when given restart conditions are met. The automatic stop conditions include a condition where the speed of the vehicle is in an automatic stop range (e.g., 10 km/h or less), and the accelerator operation has been stopped or the brake operation has been performed. The restart conditions include a condition where the accelerator operation has been started or the brake operation has been stopped. The ECU 50 also determines whether the engine 10 has been fired up after being started, that is, whether the restart operation of the engine 10 has been completed. The engine control operation and the idle stop operation may alternatively be executed using separate ECUs, respectively.

Generally, delivery of electric power in the lithium-ion battery 12 to the electrical load 15 is more effective than that to the rotating electrical machine 14 to operate in the torque assist mode. In other words, an energy loss in the torque assist mode is larger than that in the delivery of electric power to the electrical load 15. This leads to a risk that when the SOC of the lithium-ion battery 12 is decreased by the execution of the torque assist mode, thereby resulting in a decreased period of time for which it is possible to deliver electric power to the electrical load 15, it will result in a decrease in fuel efficiency of the vehicle. In order to alleviate this problem, the ECU 50 is engineered, as described below, to achieve the delivery of electric power to the electrical load 15 in priority to execution of the torque assist mode.

The ECU 50 is, as illustrated in FIG. 1, equipped with the lower limit calculator 51, the consumed power calculator 52, the SOC determiner 53, the stop controller 54, the start controller 55, the power generation controller 56, and the torque assist controller 57. These functions are achieved by performing control programs stored in the ROM of the ECU 50, but however, may alternatively be achieved in hardware, such as an electronic circuit, or at least partially achieved in software, such as a computer.

The lower limit calculator 51 works to calculate or determine a SOC lower limit that is a minimum value of the SOC of the lithium-ion battery 12 required to restart the engine 10 as a function of the state of the lithium-ion battery 12. In other words, the SOC lower limit is the value of the SOC of the lithium-ion battery 12 determined to be required to deliver electric power to the rotating electrical machine 14 to provide torque to the engine 10 for restarting the engine 10.

Specifically, mapped data used to determine the SOC lower limit as a function of parameters indicating the state of deterioration and temperature of the lithium-ion battery 12 is prepared in advance and stored in the ECU 50. In the mapped data, the SOC lower limit is determined based on an amount of electric power required by the rotating electrical machine 14 to restart the engine 10. In other words, the SOC lower limit may be viewed as being determined using the state of the lithium-ion battery 12 and the amount of electric power required by the rotating electrical machine 14 to restart the engine 10. The lower limit calculator 51 calculates the SOC lower limit as a function of the state of deterioration and temperature of the lithium-ion battery 12, as derived by the BMU 18, by look-up using the mapped data.

In this embodiment, a lower limit of an available range of a state of charge of the lithium-ion battery 12 is not selected as the SOC lower limit. This is because an output power from the lithium-ion battery 12 depends upon a condition thereof, such as the state of deterioration or temperature of the lithium-ion battery 12, associated with an output ability of the lithium-ion battery 12, so that the SOC lower limit may be selected to be higher than the lower limit of the available range of the lithium-ion battery 12 depending upon the state of the lithium-ion battery 12.

The lower limit calculator 51, therefore, determines the SOC lower limit regardless of a change in output power from the lithium-ion battery 12 arising from a change in output ability of the lithium-ion battery 12, as such as the state of deterioration or temperature of the lithium-ion battery 12. In brief, the lower limit calculator 51 determines the SOC lower limit in view of the state of the lithium-ion battery 12 because an output power from the lithium-ion battery 12 may vary even when the SOC of the lithium-ion battery 12 remains unchanged.

For instance, when the lithium-ion battery 12 is aged, the lower limit calculator 51 determines the SOC lower limit to be higher than that before the lithium-ion battery 12 is aged. When the temperature of the lithium-ion battery 12 is higher or lower than a given temperature range, the lower limit calculator 51 determines the SOC lower limit to be higher than when the temperature of the lithium-ion battery 12 is within the give temperature range.

The idle stop mode is permitted to be entered when the SOC of the lithium-ion battery 12 is higher than the SOC lower limit. The SOC lower limit is, therefore, used as an idle stop enable lower limit above which the idle stop mode is permitted to be entered to stop the engine 10.

The consumed power calculator 52 estimates or calculates an amount of electric power expected to be consumed by the electrical load 15 (which will also be referred to as a first consumed power) while the engine 10 is being stopped in the idle stop mode. The consumed amount of electric power (i.e., the first consumed power) is an amount of electric power consumed by the electrical load 15 until a given period of time passes after the engine 10 starts to be stopped in the idle stop mode. The given period of time is preferably selected as a constant period of time (e.g., 1 to 2 minutes) for which the engine 10 is highly likely to be stopped in the idle stop mode, but may alternatively be determined using a travel history of the vehicle or information about surroundings of the vehicle, as will be described later in detail.

The first consumed power is calculated based on the state of operation of the electrical load 15 using mapped data. The state of operation of the electrical load 15, as referred to herein, includes an amount of electric power required by the electrical load 15 as well as an on- or off-state of the electrical load 15. The state of operation is outputted from the electrical load 15. When the electrical load 15 whose required amount of electric power is relatively high is in the on-state, the amount of electric power required by the electrical load 15 placed in the on-state is high, or a plurality of electrical loads 15 are simultaneously in the on-state, the first consumed power is determined to be large using the mapped data. Alternatively, when the electrical load 15 whose required amount of electric power is relatively high is in the off-state, the amount of electric power required by the electrical load 15 placed in the off-state is low, or a plurality of electrical loads 15 are simultaneously in the off-state, the first consumed power is determined to be small using the mapped data.

The consumed power calculator 52 calculates an amount of electric power consumed by the electrical load 15 during operation of the engine 10 (which will also be referred to as a second consumed power). Specifically, the second consumed power is an amount of electric power consumed by the electrical load 15 for a given period of time in which the engine 10 is operating, not stopped. The given period of time is preferably selected as a constant period of time (e.g., 10 to 15 minutes) which is highly likely to be a time interval between termination of the regenerative power generation mode and a subsequent start of the regenerative power generation mode, in other words, a time interval between termination of deceleration of the vehicle and a subsequent start of deceleration of the vehicle, that is, a period of time for which the batteries 11 and 12 are kept uncharged. The given period of time may alternatively be determined using a travel history of the vehicle or information about surroundings of the vehicle, as will be described later in detail. The second consumed power is calculated by using mapped data based on the state of operation of the electrical load 15 in the same way as the first consumed power.

The SOC determiner 53 works to determine a target SOC of the lithium-ion battery 12 as a function of the first consumed power, as calculated by the consumed power calculator 52, based on the SOC lower limit calculated by the lower limit calculator 51. Specifically, the SOC determiner 53 adds an amount of electric power, as required to be stored in the lithium-ion battery 12 to compensate for the first consumed power calculated by the consumed power calculator 52, to the SOC lower limit and determines such sum as the target SOC.

The target SOC may be determined to be the sum of an amount of electric power required by the lithium-ion battery 12 to compensate for the first consumed power, the SOC lower limit, and a given margin. Specifically, the SOC determiner 53 multiplies the sum of the amount of electric power required by the lithium-ion battery 12 to compensate for the first consumed power and the SOC lower limit by a given value (e.g., 1.2) and determines it as the target SOC. The target SOC is, therefore, viewed as being determined using the SOC lower limit and an amount of electric power consumed by the electrical load 15. The target SOC may alternatively be determined to be the sum of the amount of electric power required by the lithium-ion battery 12 to compensate for the first consumed power and the SOC lower limit plus, for example, a given amount of electric power required to be stored in the lithium-ion battery 12 to continue the idle stop mode to keep the engine 10 stopped for several minutes.

The target SOC may be changed as long as it is higher than the SOC lower limit. For example, the target SOC may be stored in a memory as a fixed value without being calculated by the SOC determiner 53. The fixed value may be determined to be greater than a maximum SOC selected as the SOC lower limit.

The SOC determiner 53 also determines a torque assist enable SOC (which will also be referred to as an assist enable value) that is a minimum SOC of the lithium-ion battery 12 above which the torque assist mode is permitted to be entered. Specifically, the SOC determiner 53 calculates the torque assist enable SOC to be larger than the target SOC. More specifically, the SOC determiner 53 multiplies the target SOC by a preselected value to set it as the torque assist enable SOC.

The SOC determiner 53 considers the second consumed power, as calculated by the consumed power calculator 52, in determining the torque assist enable SOC. Specifically, the SOC determiner 53 determines a value using the second consumed power which is added to the target SOC or by which the target SOC is multiplied. For example, when the second consumed power is larger, the SOC determiner 53 corrects or determines the torque assist enable SOC to be higher than that when the second consumed power is smaller.

The stop controller 54 works to stop the engine 10 in the idle stop mode when a measured value of the SOC of the lithium-ion battery 12 is higher than or equal to the SOC lower limit, and the automatic stop conditions are met. The determination of whether the automatic stop conditions are satisfied is, as described above, achieved using information about the speed of the vehicle and driver's operation.

The start controller 55 works to control the operation of the rotating electrical machine 14 to restart the engine 10 when the restart conditions are met in the idle stop mode. The determination of whether the restart conditions are met is, as described above, achieved using the driver's operation. The start controller 55 also works to actuate the rotating electrical machine 14 in the motor mode to restart the engine 10 when the restart conditions are not yet met in the idle stop mode, but the SOC of the lithium-ion battery 12 has dropped to the SOC lower limit. This eliminates a risk of failure in restarting the engine 10 or instability in operation of the electrical load 15 due to an insufficient amount of electric power in the lithium-ion battery 12.

The power generation controller 56 works to control electrical generation of the rotating electrical machine 14 to increase the SOC to be higher than or equal to the target SOC. When it is possible to achieve the regenerative power generation using kinetic energy of the vehicle, for example, during deceleration of the vehicle, the power generation controller 56 rotates the rotating shaft of the rotating electrical machine 14 using the kinetic energy of the vehicle (i.e., the axle) to make the rotating electrical machine 14 generate electricity in the regenerative power generation mode.

When the SOC of the lithium-ion battery 12 is lower than the target SOC, and it is impossible to achieve the regenerative power generation using kinetic energy of the vehicle, for example, when the vehicle is being stopped, the power generation controller 56 drives the engine 10 and rotates the rotating shaft of the rotating electrical machine 14 using torque produced by the output shaft of the engine 10 to make the rotating electrical machine 14 generate electricity in the power generation mode (i.e., the fuel-powered electrical generator mode).

The torque assist controller 57 permits the rotating electrical machine 14 to operate in the torque assist mode when the SOC of the lithium-ion battery 12 is higher than the torque assist enable SOC. When the torque assist condition is met, and the SOC of the lithium-ion battery 12 is higher than the torque assist enable SOC, the torque assist controller 57 actuates the rotating electrical machine 14 in the motor mode to assist in moving the vehicle. The determination of whether the torque assist condition is met is achieved, as described above, using the speed of the vehicle and the information about the driver's operations.

Vehicle control tasks of an idle stop operation and a torque assist operation executed by the ECU 50 according to a sequence of logical steps or program in FIG. 2 will be described below. The vehicle control tasks are performed cyclically by the ECU 50.

Figure 2:
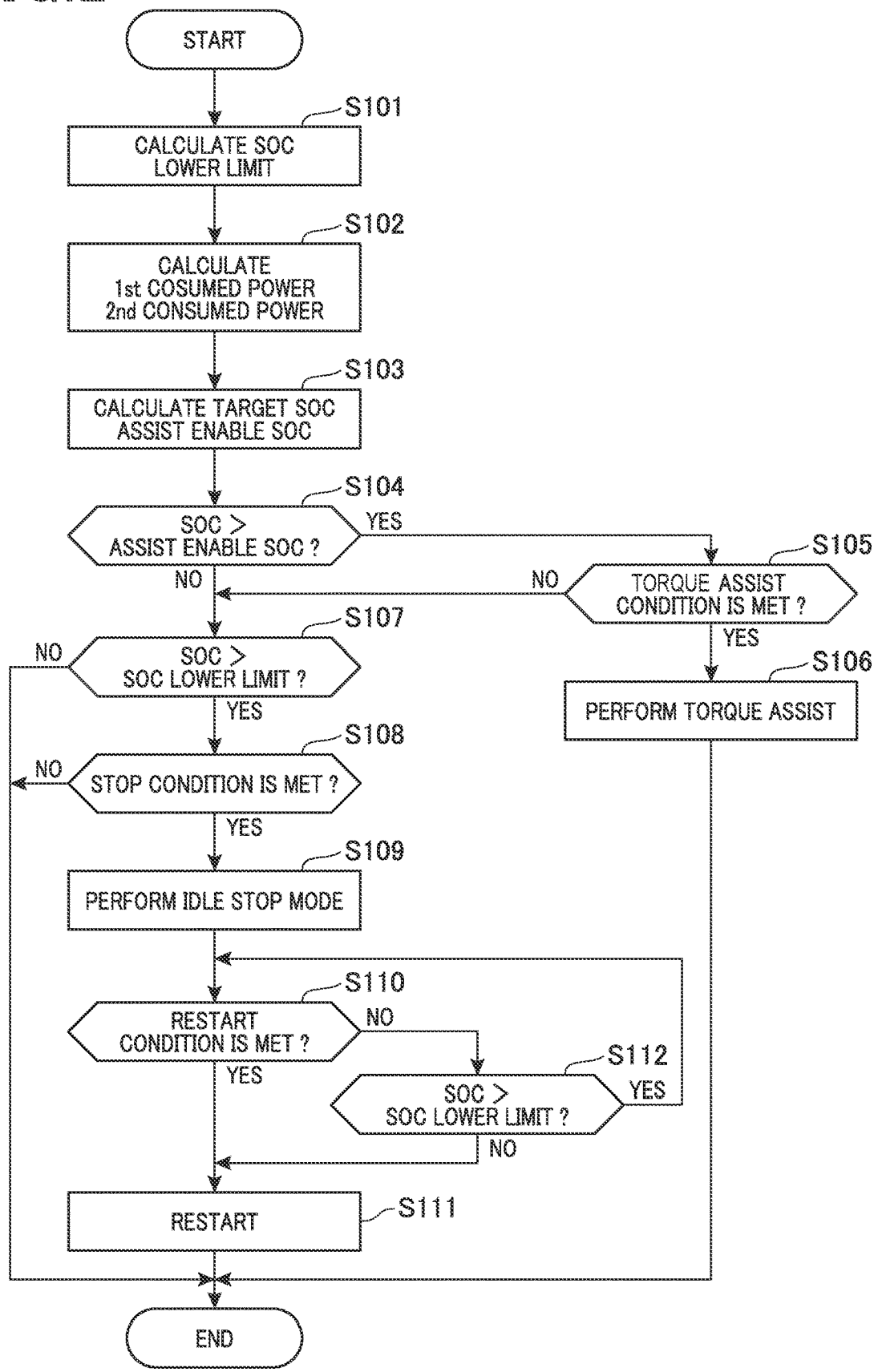
FIG. 2 is a flowchart of a vehicle control program of an idle stop operation and a torque assist operation executed by a control apparatus according to an embodiment.

After entering the program in FIG. 2, the routine proceeds to step S101 wherein the ECU 50 (i.e., the lower limit calculator 51) estimates the SOC lower limit as a function of the state of deterioration and temperature of the lithium-ion battery 12, as derived from the BMU 18, by look-up using the mapped data. The routine proceeds to step S102 wherein the ECU 50 (i.e., the consumed power calculator 52) calculates the first consumed power that is an amount of electric power expected to be consumed by the electrical load 15 while the vehicle is being stopped in the idle stop mode using the state of operation of the electrical load 15. The ECU 50 (i.e., the consumed power calculator 52) also calculates the second consumed power that is an amount of electric power expected to be consumed by the electrical load 15 while the engine 10 is being operated using the state of operation of the electrical load 15.

The routine proceeds to step S103 wherein the ECU 50 (i.e., the SOC determiner 53) determines the target SOC in consideration of the first consumed power, as calculated in step S102, based on the SOC lower limit determined in step S101. The ECU 50 also calculates the torque assist enable SOC in consideration of the second consumed power, as calculated in step S102, based on the target SOC.

The routine proceeds to step S104 wherein the ECU 50 (i.e., the torque assist controller 57) determines whether the SOC of the lithium-ion battery 12 is higher than the torque assist enable SOC. If a YES answer is obtained meaning that the SOC is higher than the torque assist enable SOC, then the routine proceeds to step S105 wherein the ECU 50 (i.e., the torque assist controller 57) acquires information about the speed of the vehicle and the driver's operations and determines using such information whether the torque assist condition is met or not. If a YES answer is obtained meaning that the torque assist condition is met, then the routine proceeds to step S106 wherein the ECU 50 (i.e., the torque assist controller 57) determines that the torque assist mode has been requested to be entered and then control the operation of the rotating electrical machine 14 to assist in driving the vehicle in the torque assist mode. The routine then terminates.

Alternatively, if a NO answer is obtained in step S104, then the routine proceeds to step S107 wherein the ECU 50 determines whether the SOC of the lithium-ion battery 12 is higher than the SOC lower limit. If a NO answer is obtained, then the routine terminates. Alternatively, if a YES answer is obtained in step S107 meaning that the SOC of the lithium-ion battery 12 is higher than the SOC lower limit, then the routine proceeds to step S108 wherein the ECU 50 determines whether the automatic stop conditions are met or not using obtained information about the speed of the vehicle and the driver's operations. If a NO answer is obtained, then the routine terminates.

Alternatively, if a YES answer is obtained in step S108 meaning that the automatic stop conditions are met, then the routine proceeds to step S109 wherein the ECU 50 (i.e., the stop controller 54) stops the engine 10 in the idle stop mode. Subsequently, the routine proceeds to step S110 wherein the ECU 50 determines whether the restart conditions are met or not. If a YES answer is obtained, then the routine proceeds to step S111 wherein the ECU 50 (i.e., the start controller 55) controls the operation of the rotating electrical machine 14 to restart the engine 10. The routine then terminates to terminate the idle stop mode.

Alternatively, if a NO answer is obtained instep S110 meaning that the restart conditions are not met, then the routine proceeds to step S112 wherein the ECU 50 obtains the SOC of the lithium-ion battery 12 and determines whether the obtained SOC is higher than the SOC lower limit or not. If a YES answer is obtained, then the routine returns back to step S110. In other words, after elapse of a given period of time since a YES answer was obtained in step S112, the ECU 50 executes step S110 again. This causes the idle stop mode to continue to stop the engine 10 until the restart conditions are met or the SOC reaches the SOC lower limit.

Alternatively, if a NO answer is obtained in step S112 meaning that the obtained SOC is lower than the SOC lower limit, then the routine proceeds to step S111 wherein the ECU 50 controls the operation of the rotating electrical machine 14 to restart the engine 10. Specifically, the ECU 50 restarts the engine 10 regardless of the restart conditions and terminates the idle stop mode.

An electric power generating operation executed by the rotating electrical machine 14 according to a program in FIG. 3 will be described below. The program in FIG. 3 is executed cyclically by the ECU 50 (i.e., the power generation controller 56).

Figure 3:
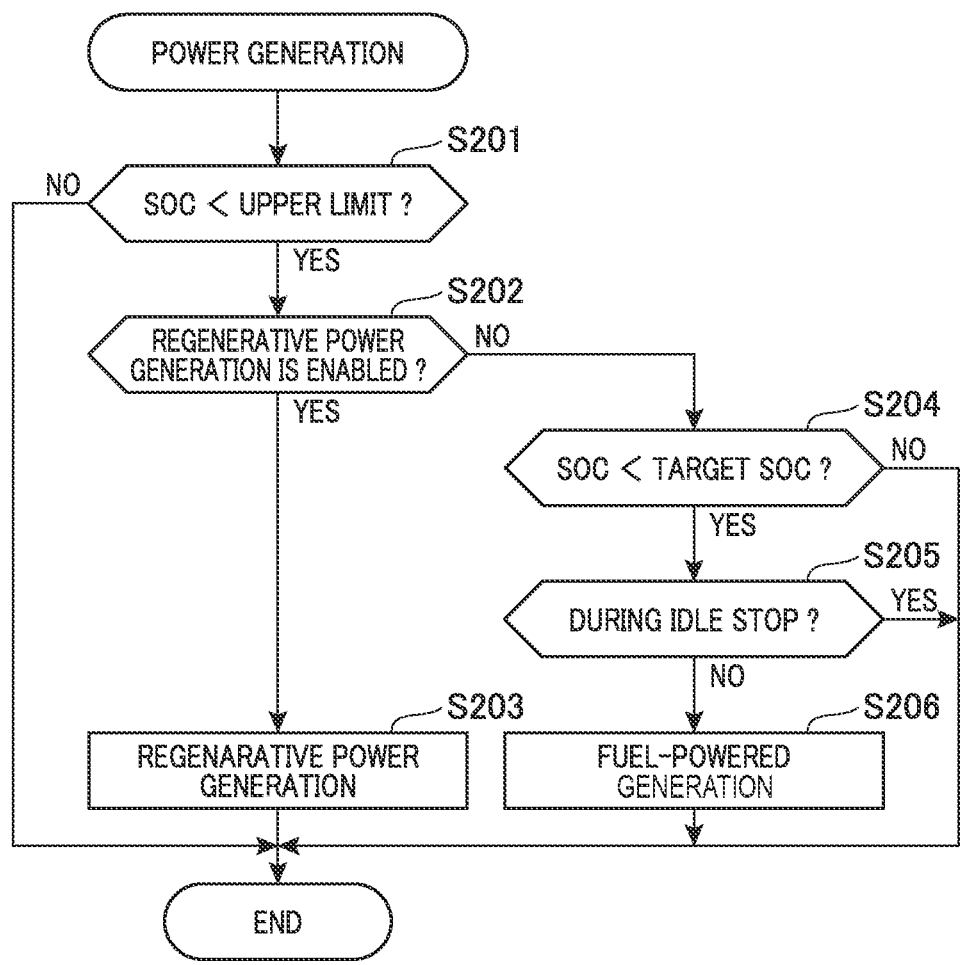
FIG. 3 is a flowchart of an electric power generation program executed by a control apparatus according to an embodiment.

After entering the program in FIG. 3, the routine proceeds to step S201 wherein the ECU 50 obtains the SOC of the lithium-ion battery 12 and determines whether the obtained SOC is lower than the upper limit of the available SOC range of the lithium-ion battery 12. If a NO answer is obtained in step S201, then the routine terminates the electric power generating operation.

Alternatively, if a YES answer is obtained in step S201, then the routine proceeds to step S202 wherein the ECU 50 determines whether the regenerative power generation is permitted to be achieved using the kinetic energy of the vehicle. When determining that the accelerator of the vehicle is not actuated using the information about the speed of the vehicle and the driver's operations, that the brake is being actuated, or that the vehicle is decelerating, the ECU 50 decides that it is possible to achieve the regenerative power generation using the kinetic energy of the vehicle. If a YES answer is obtained in step S202 meaning that it is possible to achieve the regenerative power generation using the kinetic energy of the vehicle, then the routine proceeds to step S203 wherein the ECU 50 controls the operation of the rotating electrical machine 14 to perform the regenerative power generation using the kinetic energy of the vehicle to charge the lithium-ion battery 12. The routine then terminates.

Alternatively, if a NO answer is obtained in step S202, the routine proceeds to step S204 wherein the ECU 50 determines whether the obtained SOC is lower than the target SOC or not. If a NO answer is obtained in step S204, then the routine terminates the electric power generating operation. Alternatively, if a YES answer is obtained in step S204, then the routine proceeds to step S205 wherein it is determined whether the engine 10 is being stopped in the idle stop mode. If a YES answer is obtained, the ECU 50 terminates the electric power generating operation.

Alternatively, if a NO answer in step S205, then the routine proceeds to step S206 wherein the ECU 50 controls the operation of the engine 10 and rotates the rotating electrical machine 14 using torque produced by the output shaft of the engine 10 to make the rotating electrical machine 14 generate electricity in the power generation mode (i.e., the fuel-powered electrical generator mode). When the vehicle is accelerating, the ECU 50 operates the engine 10 so as to output a degree of torque large enough for the vehicle to continue to accelerate and for the rotating electrical machine 14 to generate electricity. Alternatively, when the vehicle is being stopped with the engine 10 idling, the ECU 50 then operates the engine 10 so as to generate a degree of torque only required for the rotating electrical machine 14 to generate electricity.

Figure 4:
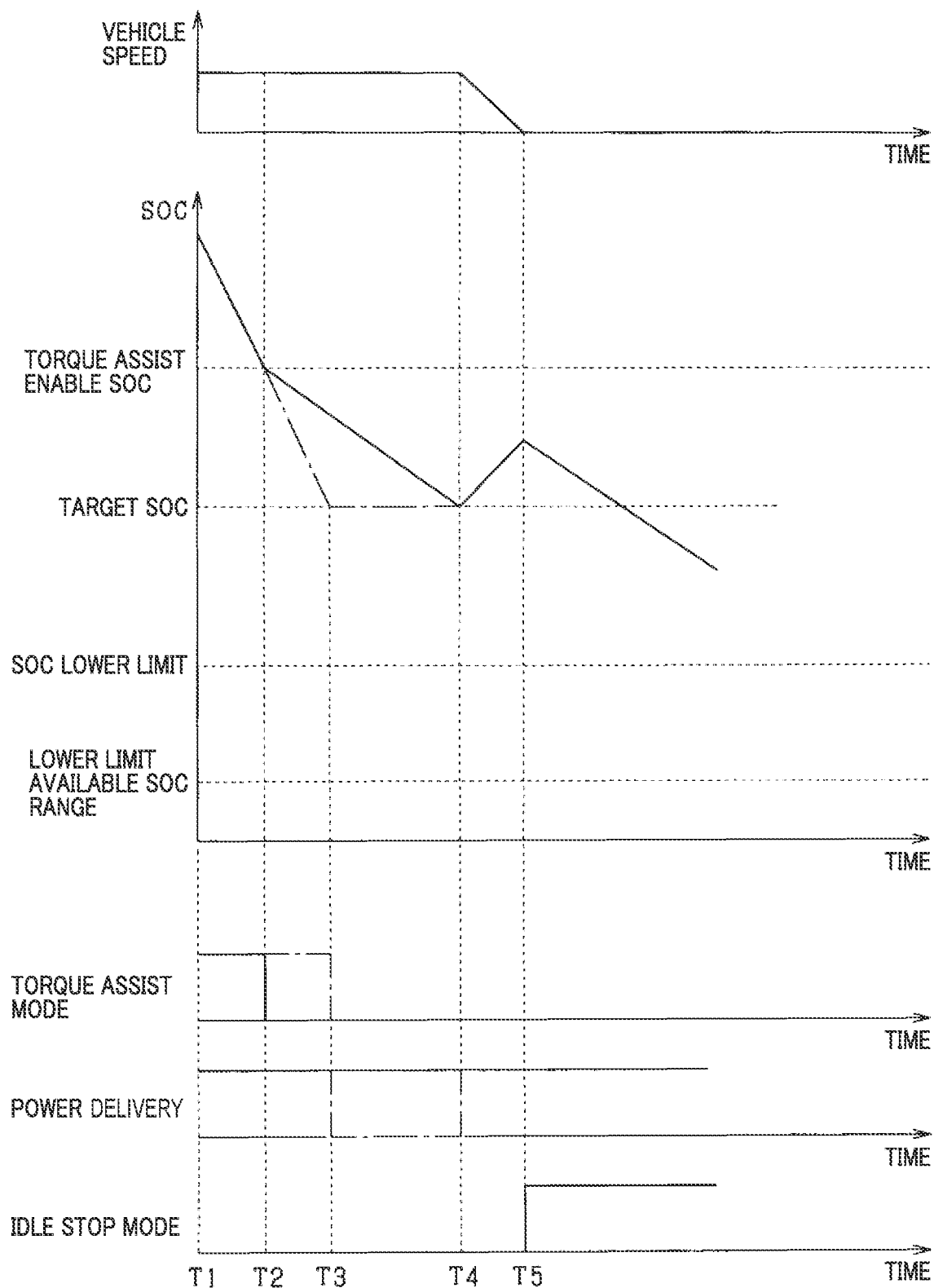
FIG. 4 is a time chart which demonstrates a transitional change in a state of charge (SOC) of a storage battery installed in a control apparatus according to an embodiment.

A change in SOC of the lithium-ion battery 12 when the engine 10 is stopped in the idle stop mode will be described with reference to FIG. 4. In FIG. 4, a chain line indicates a change in SOC in a prior art system, while a solid line indicates a change in SOC in this embodiment. For the brevity of explanation, it is assumed in the following discussion, that the target SOC for the lithium-ion battery 12 in this embodiment is identical with that in the prior art system, and that an initial value of the SOC in FIG. 4 in this embodiment is identical with that in the prior art system and higher than the torque assist enable SOC.

First, the speed of the vehicle will be described with reference to FIG. 4. The vehicle travels at a constant speed between time T1 and time T4. The vehicle decelerates between time T4 and time T5 and then stops at time T5.

A change in SOC in the prior art system will be described below. When the vehicle travels at a constant speed between time T1 and time T3, the SOC is, as indicated by the chain line, higher than or equal to the target SOC, so that the rotating electrical machine 14 operates in the torque assist mode. This causes the SOC to drop until it reaches the target SOC. Since the SOC is higher than the target SOC between time T1 and time T3, a lithium-ion battery delivers electric power to an electrical load in the prior art system.

When the vehicle travels at a constant speed between time T3 and time T4, the SOC reaches the target SOC, so that the torque assist mode is terminated. The SOC is kept at the target SOC, so that a rotating electrical machine in the prior art system operates in the fuel-powered electrical generator mode to deliver electric power to the electrical load.

When the vehicle decelerates between time T4 and time T5, the rotating electrical machine operates in the regenerative power generation mode, so that the SOC rises above the target SOC. When the vehicle stops at time T5, the automatic stop conditions are met, so that the idle stop mode is entered to stop the engine in the prior art system.

Next, a change in SOC in the control apparatus in this embodiment will be described below with reference to FIG. 4. When the vehicle travels at a constant speed between time T1 and time T2, the SOC is, as indicated by the solid line, higher than the torque assist enable SOC, so that the rotating electrical machine 14 operates in the motor mode (i.e., the torque assist mode) to assist in driving the vehicle. This causes the SOC to decrease until the torque assist enable SOC is reached. Since the SOC is higher than the target SOC between time T1 and time T2, the lithium-ion battery 12 works to deliver electric power to the electrical load 15. When the SOC reaches the torque assist enable SOC at time T2, the torque assist mode is terminated.

When the vehicle travels at a constant speed between time T2 and time T4, the SOC is lower than the torque assist enable SOC and higher than the target SOC, the lithium-ion battery 12 works to deliver electric power to the electrical load 15, so that the SOC decreases. The torque assist mode is, unlike the prior art system, inhibited from being entered, so that the lithium-ion battery 12 has a SOC sufficient to supply electric power to the electrical load 15. This results in a gradual decrease in SOC of the lithium-ion battery 12.

When the vehicle decelerates between time T4 and time T5, the rotating electrical machine 14 is actuated in the regenerative power generation mode, so that the SOC rises above the target SOC. When the vehicle is stopped at time T5, the automatic stop conditions are met, so that the idle stop mode is entered.

As apparent from the above discussion, the torque assist enable SOC in this embodiment is selected to compensate for the second consumed power that is an amount of electric power expected to be consumed by the electrical load 15 while the engine 10 is operating. This results in a decreased period of time for which the torque assist mode continues to be executed, but enables the lithium-ion battery 12 to deliver electric power to the electrical load 15 for an increased period of time. This minimizes the need to perform the fuel-powered electrical generator mode to supply electric power to the electrical load 15.

The control apparatus in this embodiment offers the following beneficial advantages.

The target SOC is set higher than the SOC lower limit. The torque assist enable SOC is set higher than the target SOC. This causes the torque assist enable SOC to be higher than the target SOC even when the electrical energy in the lithium-ion battery 12 is consumed by the torque assist mode until the SOC of the lithium-ion battery 12 reaches the torque assist enable SOC, thereby enabling the lithium-ion battery 12 to continue to deliver electric power to the electrical load 15 until the SOC decreases from the torque assist enable SOC to the target SOC. In other words, the control apparatus in this embodiment keeps electrical energy stored in the lithium-ion battery 12 which is required to be delivered to the electrical load 15 and, when the lithium-ion battery 12 stores an amount of electric power sufficient to additionally achieve the torque assist mode, permits the torque assist mode to be performed until such an excess amount of electric power is fully consumed.

The delivery of electric power in the lithium-ion battery 12 to the electrical load 15 is more effective than that to the rotating electrical machine 14 to operate in the torque assist mode. Chances to deliver electric power to the electrical load 15 may, therefore, be increased to improve power efficiency by achieving the delivery of electric power to the electrical load 15 in priority to execution of the torque assist mode. This improves the fuel economy in the engine 10.

The target SOC is, as described above, set higher than the SOC lower limit, thereby enabling the idle stop mode to continue to stop the engine 10 when the electric power in the lithium-ion battery 12 is consumed by the electrical load 15 during the stop of the engine 10. The target SOC set higher than the SOC lower limit also enables an amount of electric power to be stored the lithium-ion battery 12 which is sufficient to ensure chances to stop the engine 10 in the idle stop mode even when there is an insufficient period of time to charge the lithium-ion battery 12 after the engine 10 is restarted. This results in increased chances to stop the engine 10 in the idle stop mode, thereby improving the fuel economy.

Too small a value of the torque assist enable SOC results in an insufficient value of SOC in the lithium-ion battery 12 for compensating for the second consumed power for the electrical load 15 during operation of the engine 10, which may lead to a failure in delivering electric power to the electrical load 15. Conversely, too high a value of the torque assist enable SOC results in a decrease in chances to perform the torque assist mode even though there is a sufficient amount of electric power stored in the lithium-ion battery 12 to compensate for the second consumed power. In order to alleviate such a drawback, the control apparatus in this embodiment determines the torque assist enable SOC in consideration of the second consumed power that is an amount of electric power expected to be consumed by the electrical load 15 during operation of the engine 10. This enables the lithium-ion battery 12 to keep a SOC suitable to compensate for the second consumed power, thereby resulting in an increase in chance to execute the torque assist mode and deliver electric power to the electrical load 15. This leads to enhanced power efficiency in the lithium-ion battery 12.

The SOC lower limit is, as described above, set to a minimum SOC of the lithium-ion battery 12 which is required to restart the engine 10 and determined depending upon the state of the lithium-ion battery 12 and an amount of electric power required by the rotating electrical machine 14 to restart the engine 10. This ensures an amount of electric power required by the rotating electrical machine 14 to work as a starter to restart the engine 10 as long as the SOC of the lithium-ion battery 12 is higher than the SOC lower limit regardless of a change in state of the lithium-ion battery 12, thereby minimizing a failure in restarting the engine 10 arising from a change in state of the lithium-ion battery 12. This results in an increase in period of time for which the idle stop mode is permitted to be executed to stop the engine 10, thereby improving the fuel efficiency.

The SOC determiner 53, as described above, determines the target SOC of the lithium-ion battery 12 based on the SOC lower limit in consideration of the first consumed power that is an amount of electric power expected to be consumed by the electrical load 15 during the stop of the engine 10 in the idle stop mode. Therefore, as long as the idle stop mode is entered when the SOC of the lithium-ion battery 12 is higher than the target SOC, it prevents the electric power in the lithium-ion battery 12 from being consumed by the electrical load 15 to decrease the SOC below the SOC lower limit during the stop of the engine 10 in the idle stop mode, that is, prevents the SOC from being decreased below the SOC lower limit to undesirably restart the engine 10 before the restart conditions are met during the stop of the engine 10 in the idle stop mode. This results in an increase in period of time for which the idle stop mode is permitted to be executed to stop the engine 10, thereby improving the fuel efficiency.

The automatic stop conditions may be satisfied within a short period of time after the engine 10 is restarted depending upon road conditions. Therefore, if the target SOC is selected to be identical with the torque assist enable SOC, it may result in an insufficient time to charge the lithium-ion battery 12 to increase the SOC thereof depending upon the road conditions. This results in a high probability of missing a chance to enter the idle stop mode to stop the engine 10. In order to alleviate the above problem, the control apparatus in this embodiment is designed to set the target SOC higher than the torque assist enable SOC to have an amount of electric power in the lithium-ion battery 12 sufficient to ensure chances to stop the engine 10 in the idle stop mode even when there is an insufficient period of time to charge the lithium-ion battery 12 to restore the SOC. This improves the fuel economy.

The start controller 55 compares the SOC of the lithium-ion battery 12 with the SOC lower limit to determine whether the engine 10 should be restarted before the restart conditions are met. In other words, the ECU 50 restarts the engine 10 when the SOC of the lithium-ion battery 12 reaches the SOC lower limit even if the restart conditions are not yet satisfied. This eliminates a risk that the SOC decreases below the SOC lower limit during a stop of the engine 10 in the idle stop mode, which would make it impossible to restart the engine 10.

Usually, when the rotating electrical machine 14 is actuated in the fuel-powered electrical generator mode when the vehicle is accelerating or traveling at a constant speed, it will result in an increased consumption of fuel in the engine 10. The improvement of the consumption of fuel is, however, achieved by increasing a period of time in which the engine 10 is kept stopped in the idle stop mode or the electric power continues to be delivered to the electrical load 15 even if the fuel is consumed to achieve the power-powered electrical generation. Therefore, the control apparatus in this embodiment is engineered to actuate the rotating electrical machine 14 in the fuel-powered electrical generator mode when the SOC of the lithium-ion battery 12 is lower than the target SOC even if the vehicle is not decelerating in order to increase the SOC above the target SOC. This results in an increased period of time for which the engine 10 is kept stopped in the idle stop mode, thereby improving the fuel economy.

MODIFICATIONS

The control apparatus in the above embodiment may be modified in ways described below. In the following discussion, the same reference numbers as used in the above embodiment refer to the same or similar parts, and explanation thereof in detail will be omitted.

The consumed power calculator 52 may estimate the first consumed power that is an amount of electric power expected to be consumed by the electrical load 15 using a travel history of the vehicle. For instance, the travel history includes the frequency of entry to the idle stop mode to stop the engine 10 or the length of time the engine 10 is kept stopped in the idle stop mode. Use of the travel history enables the tendency of the frequency of entry to the idle stop mode or the length of time the engine 10 is kept in the idle stop mode to be derived which is associated with the first consumed power. The use of the travel history, therefore, results in enhanced accuracy in calculating the first consumed power.

Specifically, when determining that the frequency of entry to the idle stop mode is large, the consumed power calculator 52 may calculate the first consumed power to be larger than that when determining that the frequency of entry of the idle stop mode is relatively small. When determining that the length of time the engine 10 is kept in the idle stop mode is longer, the consumed power calculator 52 may calculate the first consumed power to be larger than that when determining that the length of time the engine 10 is kept in the idle stop mode is shorter. The enhanced accuracy in calculating the first consumed power enables a margin between the target SOC and the SOC lower limit to be decreased to decrease the value of the target SOC, thereby enabling the number of times the rotating electrical machine 14 is actuated in the fuel-powered electrical generator mode to be decreased to increase a period of time for which electric power can be delivered to the electrical load 15, which improves the fuel economy.

The SOC determiner 53 may be designed to correct the target SOC using the travel history of the vehicle. For instance, when determining that the frequency of entry of the idle stop mode is shorter using the travel history, the SOC determiner 53 may calculate the target SOC to be smaller than that when determining that the frequency of entry of the idle stop mode is larger. When determining that the length of time the engine 10 is kept in the idle stop mode is shorter, the SOC determiner 53 may calculate the target SOC to be smaller than that when determining that the length of time the engine 10 is kept in the idle stop mode is longer. The use of the travel history enables a margin between the target SOC and the SOC lower limit be decreased to decrease the value of the target SOC, thereby enabling a period of time for which electric power can be delivered to the electrical load 15 to be increased, which improves the fuel economy.

The consumed power calculator 52 may alternatively be engineered to estimate the first consumed power that is an amount of electric power expected to be consumed by the electrical load 15 using information about surroundings of the vehicle. For instance, such surrounding information includes traffic congestion around the vehicle (i.e., the road is crowded or not), the width of the road, the number of lanes on the road, or the number of times the vehicle passes through traffic lights. The surrounding information may be derived using an in-vehicle camera or an in-vehicle communication system. When there is a traffic jam, the frequency of entry to the idle stop mode to stop the engine 10 is expected to be larger than that when the traffic is light. When the width of the road or the number of traffic lanes is larger, a period of time for which the traffic light indicates red instructing the driver to stop the vehicle is expected to be longer than that when the width of the road or the number of traffic lanes is smaller, thus resulting in an increase in period of time for which the engine 10 is kept stopped in the idle stop mode. When the number of times per unit time the vehicle passes through traffic lights is larger, the frequency of entry to the idle stop mode to stop the engine 10 is expected to be larger than that when the number of times per unit time the vehicle passes through traffic lights is smaller.

The first consumed power, as described already, depends upon the frequency of entry of the idle stop mode or the length of time the engine 10 is kept stopped in the idle stop mode. The consumed power calculator 52 may therefore be engineered to estimate the first consumed power using the obtained surrounding information. Specifically, when determining that the traffic is heavy using the surrounding information, the consumed power calculator 52 may calculate the first consumed power to be larger than that when determining that the traffic is light. When determining that the width of the road is larger, the consumed power calculator 52 may determine the first consumed power to be larger than that when determining that the width of the road is narrower. When determining that the number of traffic lanes is larger, the consumed power calculator 52 may calculate the first consumed power to be larger than that when determining that the number of traffic lanes is smaller. When determining that the number of times per unit time the vehicle passes through traffic lights is larger, the consumed power calculator 52 may calculate the first consumed power to be larger than that when determining that the number of times per unit time the vehicle passes through traffic lights is smaller.

The above ways improve the accuracy in estimating the first consumed power, thereby enabling a margin between the target SOC and the SOC lower limit to be decreased to decrease the value of the target SOC, thereby enabling a period of time for which electric power can be delivered to the electrical load 15 to be increased, which improves the fuel economy.

The SOC determiner 53 may correct the target SOC using the surroundings information. For example, when determining that the traffic is heavy using the surrounding information, the SOC determiner 53 may correct the target SOC to be larger than that when determining that the traffic is light. When determining that the width of the road is larger using the surrounding information, the SOC determiner 53 may correct the target SOC to be larger than that when determining that the width of the road is smaller. When determining that the number of traffic lanes is larger using the surrounding information, the SOC determiner 53 may correct target SOC to be larger than that when determining that when determining that the number of traffic lanes is smaller. When determining that the number of times per unit time the vehicle passes through traffic lights is larger using the surrounding information, the SOC determiner 53 may correct the target SOC to be larger than that when determining that the number of times per unit time the vehicle passes through traffic lights is smaller.

The SOC determiner 53 may be designed to increase the target SOC when it is determined using the travel history or the surrounding information that a time interval between start and stop of the vehicle tends to be shorter than a given value. Specifically, the SOC determiner 53 calculates a time interval between when restart conditions have been met and when the automatic stop conditions have been met using the travel history and the surrounding information. When that time interval is determined to be relatively short, the SOC determiner 53 increase the target SOC. This enables an amount of electric power sufficient to restart the engine 10 to be kept in the lithium-ion battery 12 when the time interval between satisfaction of the restart conditions and satisfaction of the automatic stop conditions is too short to additionally charge an amount of electric power required to achieve a restart of the engine 10 in the lithium-ion battery 12. This enables a period of time for which electric power can be delivered to the electrical load 15 to be increased, which improves the fuel economy.

The above embodiment uses the rotating electrical machine 14 as an engine starter, but may alternatively be equipped with a separate engine starter instead of the rotating electrical machine 14.

In the above embodiment, the state of deterioration or temperature of the lithium-ion battery 12 is used as a parameter representing the state of the lithium-ion battery 12, but however, a combination of output voltage (or output current) and a SOC of the lithium-ion battery 12 may be used as indicating the state of the lithium-ion battery 12 associated with an output ability thereof. For instance, when an output voltage from the lithium-ion battery 12 is low for the SOC of the lithium-ion battery 12, the lithium-ion battery 12 may be determined to be deteriorated to increase the SOC lower limit.

In the above embodiment, when the SOC is lower than the SOC lower limit, the lead-acid storage battery 11 may deliver electric power to the rotating electrical machine 14 to restart the engine 10.

In the above embodiment, the lower limit of the available SOC range of the lithium-ion battery 12 may be selected as the SOC lower limit.

Usually, when the number of times the rotating electrical machine 14 is operated in the regenerative power generation mode is larger, the lithium-ion battery 12 has a SOC higher enough to output electric power than when the number of times the rotating electrical machine 14 is operated in the regenerative power generation mode is smaller. Such a margin of the SOC may be used to actuate the rotating electrical machine 14 in the torque assist mode. For example, the torque assist enable SOC may be decreased. The SOC determiner 53 may determine the torque assist enable SOC in view of the state of implementation of the regenerative power generation mode. Specifically, when determining the torque assist enable SOC, the SOC determiner 53 may calculate a value which is added to the target SOC or by which the target SOC is multiplied using the state of implementation of the regenerative power generation mode. Alternatively, the SOC determiner 53 may correct the sum of the target SOC and a given value or the product of the target SOC and a given value using the state of implementation of the regenerative power generation mode.

The state of implementation of the regenerative power generation mode may include either one of a frequency of implementation of the regenerative power generation mode and a period of time for which the rotating electrical machine 14 is actuated in the regenerative power generation mode. The state of implementation of the regenerative power generation mode may be stored in a memory of the ECU 50. When determining that the frequency of implementation of the regenerative power generation mode is larger, the SOC determiner 53 may determine or correct the torque assist enable SOC to be smaller than that when determining that the frequency of implementation of the regenerative power generation mode is smaller. When determining that the period of time for which the rotating electrical machine 14 is actuated in the regenerative power generation mode is longer, the SOC determiner 53 may determine or correct the torque assist enable SOC to be smaller than that when determining that the period of time for which the rotating electrical machine 14 is actuated in the regenerative power generation mode is shorter. This enables the lithium-ion battery 12 to store electrical energy in favor of delivery of electric power to the electrical load 15 and also increases chances to execute the torque assist mode.

When the SOC of the lithium-ion battery 12 has a tendency to increase, there is a high probability that the lithium-ion battery 12 has a sufficient SOC to output electric power to actuate the rotating electrical machine 14 in the torque assist mode as compared with when the SOC is decreasing. The SOC determiner 53 may determine the torque assist enable SOC in view of a transitional change in SOC of the lithium-ion battery 12 before the automatic stop conditions are met. The history of the transitional change in SOC of the lithium-ion battery 12 may be stored in a memory of the ECU 50. When determining that the SOC has a tendency to increase, e.g., the period of time for which the SOC increases is long or the frequency of increase in SOC is high before the automatic stop conditions are met, the SOC determiner 53 may determine or correct the torque assist enable SOC to be smaller than that when determining that the SOC has a tendency to decrease.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. A control apparatus for use in a vehicle which is equipped with an internal combustion engine, a starter which works to start the internal combustion engine, a rotating electrical machine which selectively works in a torque assist mode to assist in moving the vehicle and a power generation mode to generate electricity, a storage battery which is charged by electric power delivered from the rotating electrical machine, and an electrical load to which electric power is supplied from the storage battery, the vehicle being designed to stop the internal combustion engine in an idle stop mode, the control apparatus comprising:
   a stop controller which stops the internal combustion engine in the idle stop mode when a state of charge of the storage battery is higher than a lower limit, the lower limit being a minimum state of charge required for the starter to start the internal combustion engine;
   a start controller which controls operation of the starter to restart the internal combustion engine when the state of charge of the storage battery is lower than or equal to the lower limit or a restart condition is met during the idle stop mode;
   a power generation controller which controls generation of electricity by the rotating electrical machine to provide to the storage battery to bring the state of charge of the storage battery to be higher than or equal to a target state of charge;
   a torque assist controller which controls operation of the rotating electrical machine in a torque assist mode to assist in driving the vehicle whenever a torque assist condition is met and the state of charge of the storage battery is higher than a torque assist enable state of charge and to cease assistance in driving the vehicle when the state of charge reduces in value from higher than the torque assist enable state of charge to equal to or lower than the torque assist enable state of charge; and
   a SOC (state of charge) determiner which determines (1) the target state of charge to be higher than the lower limit because the target state of charge includes the lower limit and an amount of power expected to be consumed by the electrical load while the internal combustion engine is in the idle stop mode and (2) the torque assist enable state of charge to be larger than the target state of charge by an amount that is the expected power to the electric load when the rotating electrical machine is in the torque assist mode.

2. A control apparatus as set forth in claim 1, wherein the SOC determiner determines the torque assist enable state of charge based on the target state of charge and an amount of electric power expected to be consumed by the electrical load during operation of the internal combustion engine.

3. A control apparatus as set forth in claim 2, wherein the SOC determiner determines a sum of the target state of charge and the amount of electric power expected to be consumed by the electrical load during operation of the internal combustion engine as the torque assist enable state of charge.

4. A control apparatus as set forth in claim 1, wherein the rotating electrical machine is configured to operate in a regenerative power generation mode to generate electricity using kinetic energy of the vehicle during deceleration of the vehicle, and wherein the SOC determiner determines the torque assist enable state of charge based on the target state of charge and implementation of the regenerative power generation mode.

5. A control apparatus as set forth in claim 4, wherein, when the SOC determiner determines the torque assist enable state of charge based on the target state of charge and the implementation of the regenerative power generation mode the torque assist enable state of charge has an inverse relationship to a frequency of implementation of the regenerative power generation mode or a period of time in which the rotating electronic machine is in the regenerative power generation mode such that the torque assist enable state of charge decreases as the frequency increases or the period of time increases and the torque assist enable state of charge increases as the frequency decreases or the period of time decreases.

6. A control apparatus as set forth in claim 1, wherein the SOC determiner determines the torque assist enable state of charge based on the target state of charge and a transitional change in state of charge of the storage battery before the automatic stop condition is met.

7. A control apparatus as set forth in claim 6, wherein, when the SOC determiner determines the torque assist enable state of charge based on the target state of charge and the transitional change, the torque assist enable state of charge has an inverse relationship with the transitional change such that an increase in the transitional change results in a decrease in the torque assist enable state of charge.

8. A control apparatus as set forth in claim 1, wherein the SOC determiner determines the lower limit based on a state of the storage battery and an amount of electric power required by the starter to restart the internal combustion engine.

9. A control apparatus as set forth in claim 1, wherein the SOC determiner determines the target state of charge based on the lower limit and an amount of electric power expected to be consumed by the electrical load during the idle stop mode.

10. A control apparatus as set forth in claim 1, wherein the rotating electrical machine is configured to operate in a power generation mode to generate electricity using drive energy produced by the internal combustion engine, and wherein when the state of charge of the storage battery is lower than the target state of charge, the power generation controller actuates the internal combustion engine and also operates the rotating electrical machine to produce the electricity in the power generation mode using the drive energy produced by the internal combustion engine.

* * * * *